Jan. 30, 1923.
J. C. HALLADA.
MOTOR VEHICLE SIGNAL.
FILED DEC. 3, 1921.
1,443,739
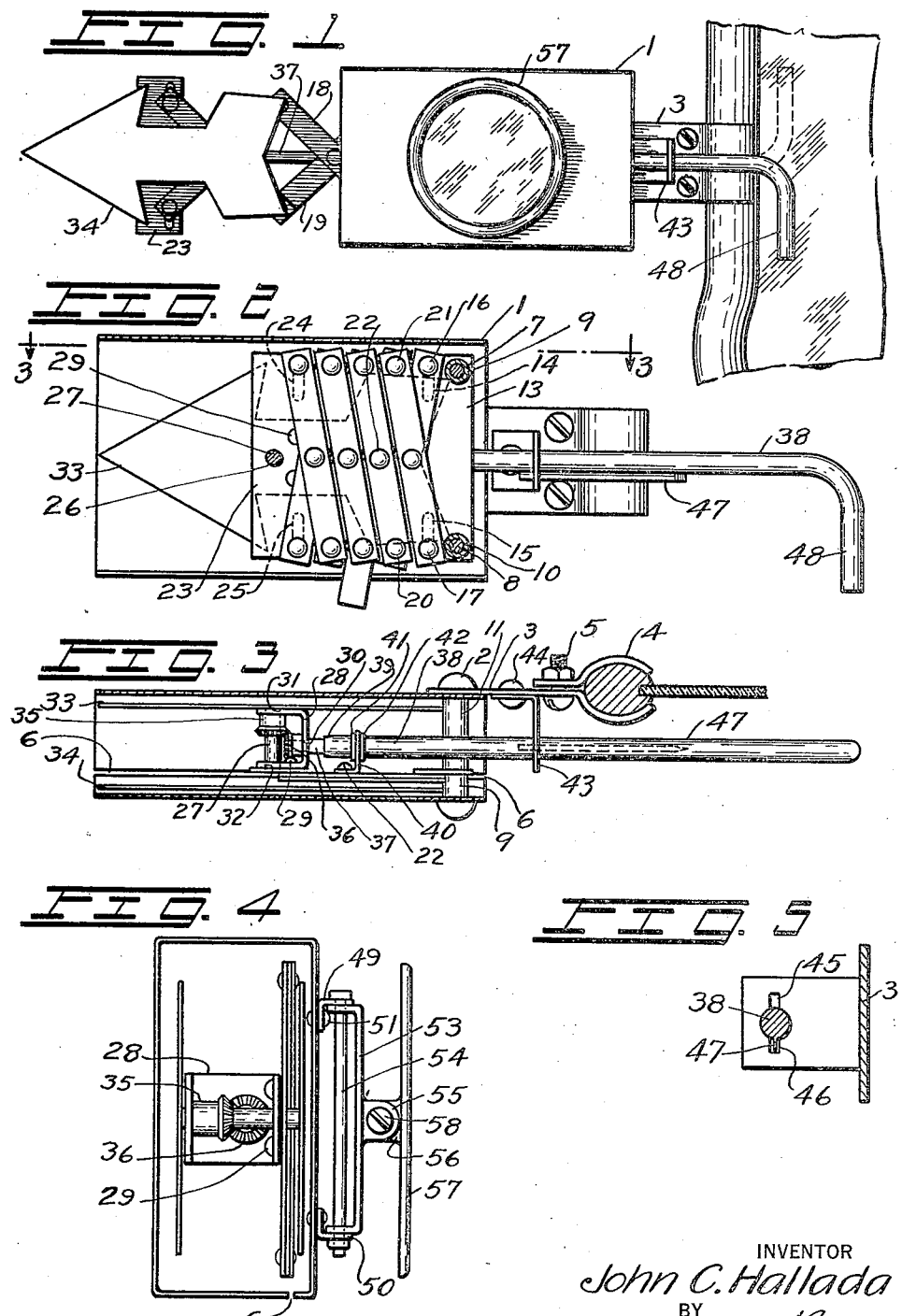
INVENTOR
John C. Hallada
BY
Harry Bowen
ATTORNEY Patented Jan. 30, 1923.

1,443,739

UNITED STATES PATENT OFFICE.

JOHN C. HALLADA, OF SEATTLE, WASHINGTON.

MOTOR-VEHICLE SIGNAL.

Application filed December 3, 1921. Serial No. 519,745.

*To all whom it may concern:*

Be it known that I, JOHN C. HALLADA, a citizen of the United States, residing at Seattle, county of King, and State of Washington, have invented a new and useful Motor-Vehicle Signal; and I do hereby declare that the following is a full, clear, and exact specification, such as will enable others skilled in the art to which it appertains to make and use the same.

The invention is a device by which the driver of a motor vehicle may inform the driver of another vehicle coming from the rear, or coming in the opposite direction, when he desires to turn either to the right or left or to stop.

The object of the invention is to construct a device for signaling to the rear and to the front of a motor vehicle which may be installed in a casing on the side of the windshield and which may be operated by a single lever, while at the same time it will readily designate if the vehicle is to turn either to the right or left or to stop.

Another object of the invention is to construct a device for signaling to the rear and to the front of motor vehicle with an arrow on each side of the end of lazy tongs which are held in a suitable casing with both the arrows and the tongs operated by a single lever.

Another object of the invention is to provide a device for signaling to the rear and to the front of motor vehicles by the use of two arrows on the end of lazy tongs which are held in a casing so that the center of the arrows will travel in a straight line which will be the center line of the casing in which they are held.

And still another object of the invention is to provide a device for signaling to the rear and to the front of motor vehicles by the use of two arrows on the end of lazy tongs which arrows may be turned either to the right or left or in a vertical position and the lazy tongs moved outward and inward by one and the same lever, while at the same time the device cannot be drawn inward when the arrows are in a vertical position.

With these ends in view, the invention embodies a casing with a bracket on one end for holding it to a windshield, lazy tongs inside of the casing, one of the bars projecting from the lazy tongs thru a slot in the bottom of the casing which will act as a guide and two arrows on the end of the lazy tongs. A telescoping shaft projects from one end, which is connected to the lazy tongs so that they may be pushed outward or pulled inward by it and on the inner end of the inside section of the telescoping shaft is also a bevel gear which meshes with a similar bevel gear on the back of the arrows, so that as the handle is turned upward or downward it will move the arrows to any desired position. On this shaft is also a key which in the closed position fits into a slot in a guide and this key prevents the handle being pulled inward when the arrows are in a vertical position at which time the key would not be in line with the slot.

Other features and advantages of the invention will appear from the following description taken in connection with the drawings, wherein—

Figure 1 is a side elevation.

Figure 2 is a sectional view with a side plate and one arrow removed.

Figure 3 is a sectional plan on line 3—3 of Figure 2.

Figure 4 is an end elevation.

Figure 5 is a cross section on line 5—5 of Figure 2.

In the drawings I have shown my device as it would be installed in Figure 1 with the arrows indicating that the vehicle is about to turn to the left. The device is held in a casing 1 which is held by the rivets 2 thru an arm 3 and this is clamped to the side of the windshield by a clip 4 held by the bolts 5. The casing 1 is constructed of a flat piece of material bent as shown in Figure 4 with a slot 6 in the bottom near the front side. This casing is rigidly held in the position shown by the bolts 7 and 8 upon which are the separators 9 and 10 and 11 and 12 between which the plate 13 is also held. In the inner side of the plate 13 are the slotted holes 14 and 15 in which the ends of the lazy tongs are pivoted by the bolts 16 and 17. These tongs are constructed with the diagonal bars 18 and 19, one of which has an end which extends through the slot 6 in the bottom of the casing to form a guide for the tongs which are held together at their ends by the rivets 20 and 21 and at their centers by the rivets 22. At the outer ends of the lazy tongs is another plate 23 with slotted holes 24 and 25 in it in which the ends of the lazy tongs are held and in its center is another hole 26 in which is the shaft 27 which forms the axis of the arrows. A U shaped bracket 28 is riveted to the plate 23 by the rivets 29 and this has a hole 30 in its back and holes 31 and 32 in its extended ends thru which the shaft 27 also passes. On the end of the shaft 27 the arrows 33 and 34 are rigidly mounted and in the center of the shaft a bevel gear 35 is also fixedly mounted upon it. Meshing with this gear is another bevel gear 36 which is fixedly mounted upon the end of a square rod 37 which is turned round to form a bearing in the hole 30 and which is held in a round tube 38 which forms the operating lever. At the end of the tube 38 the sides are bent in against the flat sides of the square bar 37 at the points 39 as shown in Figure 3 to prevent the square rod 37 from turning inside of the tube. The tube 38 is held in a bracket 40 which is held on one of the rivets 22 at the centers of the lazy tongs and has collars 41 and 42 on each side of the bracket. It is also held in a bracket 43 which is held to the arm 3 by the rivet 44 and in this bracket are the slotted holes 45 and 46 thru which the key 47 on one side of the tube 38 may pass when the arrows are in a horizontal position. The outer end 48 of the tube 38 is bent at right angles to the tube to act as a handle to the lever as shown in Figure 2 so that the arrows may readily be turned. On the front side of the casing 1 two clips 49 and 50 may be held by the rivets 51 and 52, between which a U shaped bracket 53 may be held on the bolt 54 which bracket may have a lug 55 extending from it and to this lug a similar lug 56 on the back of a mirror 57 made to be pivotedly mounted on a bolt 58 when it is desired to use a mirror on the casing.

It will be understood that changes may be made in the construction without departing from the spirit of the invention. One of which changes may be in the placing of the clip 40 on any of the sections of the lazy tongs other than the one shown; another may be in the use of one arrow instead of two as shown; another may be in the use of more or less sections of the lazy tongs than the number shown and still another may be in the use of a wooden handle placed over the end of the metal handle. It will also be understood that a different type of bracket may be used for holding the bevel gears which will permit the width of the casing to be decreased and it will also be understood that a different type of bracket may be used for holding the device to a windshield.

The operation will be readily understood from the foregoing description. To use the device it is placed on the windshield of a motor vehicle by placing the bracket 4 around the side of the windshield and gripping it to the arm 3 by tightening up the bolts 5. Ordinarily the device will remain inside of the casing 1 as shown in Figure 2 with the handle 48 projecting out in front of the windshield. When the driver of the car desires to turn either to the right or left or to stop he pushes the handle 48 into the casing and this causes the arrows supported on the end of the lazy tongs to move outward as shown in Figure 1. This position would indicate that he desired to turn to the left, then should he desire to turn to the right he would move the handle 48 from the position shown in full lines to that shown in dotted lines in Figure 1 which action would turn the arrows a complete half turn in a vertical plane so that they would point to the right which would indicate that he desired to turn to the right; or if he desired to stop he would turn the handle to a horizontal position, in which position the arrows would be in a vertical position pointing downward. It will be seen that in this position it would be impossible to draw the arrows into the casing as the key 47 would not be in line with either of the notches 45 or 46. When it is desired to draw the arrows into the casing the handle 48 must either be turned upward or downward which will bring the key 47 in line with either of the slots 45 or 46.

The entire device should be enameled a very dark color, preferably black, with the exception of the arrows which should be white or it will be understood that any desired color scheme may be used or any substance may be placed on the arrows to make it easy to see them in the dark.

Having thus fully described the invention what I claim is new and desire to secure by Letters Patent is:—

1. A motor vehicle signal of the type described embodying a casing with a slot in its bottom and which is open at both ends, a bracket holding the casing to the center of a windshield, two posts thru the casing near one end, a plate held between sleeves on the posts, lazy tongs held in slotted holes on the plate, arrows on the outer end of the lazy tongs, a tubular shaft thru the center of the device, a handle on the outer end of the shaft, a square shaft sliding in the tubular shaft, a bevel gear on the outer end of the square shaft, a similar bevel gear fixedly mounted on the shaft supporting the arrows and held in the outer end of the lazy tongs, said gears arranged so that as the shaft is rotated it will turn the arrows, a clip projecting from the center of the lazy tongs with a hole in it thru which the shaft passes, collars on the shaft on each side of the clip, arranged so that as the shaft is pushed outward or pulled inward it will cause the lazy tongs to move with it, and another clip on the bracket which holds the device to the windshield with a hole in it thru which the shaft passes, which hole has slots in its upper and lower side to permit a key on the shaft to pass thru them.

2. A motor vehicle signal of the type described comprising a casing with a bracket on one end for holding the device to the side of a windshield, lazy tongs with arrows on their outer end held inside of the casing, bevel gears in the end of the lazy tongs for rotating the arrows, a tubular shaft thru the center of the casing for moving the lazy tongs outward and inward, a rod slidably mounted in the tubular shaft, for operating the bevel gears, a key on the shaft which passes thru slots in a clip for supporting the shaft and a handle on the end of the shaft.

3. A device of the type described embodying a rectangular casing, a bracket on one end of the casing, a slot in the bottom of the casing, lazy tongs suitably mounted inside of the casing, arrows on the end of the lazy tongs, bevel gears on the end of the lazy tongs for rotating the arrows, a shaft thru the center of the casing with a longitudinal hole in one end, a handle on the outer end of the shaft, collars on the inner end of the shaft, a clip on the lazy tongs between the collars on the shaft and thru which the shaft passes, a smaller section of shaft slidably mounted in the longitudinal bore in the end of the shaft, the walls of the inner end of the shaft flattened to prevent the inner section from turning inside of it, the outer end of the smaller section of the shaft fixedly mounted in one of the bevel gears and a key on the shaft which may pass thru holes in a clip supporting the shaft when the arrows are in a horizontal position, but which will not pass thru the holes when the arrows are in a vertical position.

4. A device of the class described embodying a casing, a bracket on one end of the casing, a bar in one end of the casing, slotted holes in each end of the bar, the ends of lazy tongs mounted with rivets in the slotted holes, another bar at the other end of the lazy tongs, slotted holes in each end of the bar to which the lazy tongs are connected, a bracket on one side of the bar, a shaft thru the bracket, arrows mounted on each end of the shaft, a bevel gear mounted on the shaft, another bevel gear meshing with it, a telescoping shaft on the end of which the second bevel gear is mounted, means for preventing this inner section of the shaft from turning in the outer section, a clip connecting the inner end of the larger section of the shaft to the lazy tongs, a handle on the outer end of the larger section of the shaft, a key on the shaft which passes thru slots in a clip supporting the shaft when the shaft is held in a certain position, clips on the side of the casing, a U shaped bracket held by a bolt between the clips, a thumb nut on the end of the bolt, a lug on the center of the U bracket and a mirror with a lug on its back which is held by a thumb screw in the lug on the U bracket, said device for supporting the mirror so arranged that the mirror may be tilted upward or downward or from one side to the other.

5. A motor vehicle signal of the type described comprising a casing with a bracket on one end for holding the device to the side of a windshield, lazy tongs with arrows on their outer end held inside of the casing, bevel gears in the end of the lazy tongs for rotating the arrows, a telescoping shaft thru the center of the casing for moving the lazy tongs outward and inward and for operating the bevel gears, a key on the shaft which passes thru slots in a clip for supporting the shaft, a handle on the end of the shaft and a mirror on the side of the casing.

6. A device of the type described embodying a rectangular casing, a bracket on one end of the casing, a slot in the bottom of the casing, lazy tongs suitably mounted inside of the casing, arrows at the end on each side of the lazy tongs, bevel gears attached to the end of the lazy tongs for rotating the arrows, a telescoping shaft thru the center of the casing, a handle on the outer end of the larger section of the shaft, collars on the inner end of the larger section of the shaft, a clip on the lazy tongs between the collars on the shaft and thru which the rod passes, this end of the larger section of the shaft also squared to prevent the square inner section from turning inside of it, the outer end of the smaller section of the shaft fixedly mounted in one of the bevel gears, a key on the shaft which may pass thru slots in a clip supporting the shaft when the arrows are in a horizontal position but which will not pass thru the slots when the arrows are in a vertical position and a mirror adjustably mounted on the front of the casing.

7. A device of the class described embodying a casing, a bracket on one end of the casing, a bar in one end of the casing, slotted holes in each end of the bar, the ends of lazy tongs mounted with rivets in the slotted holes, another bar at the other end of the lazy tongs, slotted holes in each end of the bar to which the lazy tongs are connected, a bracket on one side of the bar, a shaft thru the bracket, arrows mounted on each end of the shaft, said arrows rotating in a vertical plane, a bevel gear mounted on the shaft, another bevel gear meshing with it, a telescoping shaft on the end of which the second bevel gear is mounted, means for preventing this section of the shaft from turning in the outer section, a clip connecting the inner end of the larger section of the shaft to the lazy tongs, a handle on the outer end of the larger section of the shaft, and a key on the shaft which passes thru slots in a clip supporting the shaft when the shaft is held in a certain position.

JOHN C. HALLADA.